(12) United States Patent
Elwany et al.

(10) Patent No.: US 12,454,005 B2
(45) Date of Patent: Oct. 28, 2025

(54) METHODS OF OPTIMIZING 3-D PRINTING PARAMETERS FOR METALLIC MATERIALS

(71) Applicant: The Texas A&M University System, College Station, TX (US)

(72) Inventors: Alaa Elwany, College Station, TX (US); Ibrahim Karaman, College Station, TX (US); Raymundo Arroyave, College Station, TX (US); Raiyan Seede, College Station, TX (US); Bing Zhang, College Station, TX (US); Luke Johnson, College Station, TX (US)

(73) Assignee: The Texas A&M University System, College Station, TX (US)

( * ) Notice: Subject to any disclaimer, the term of this patent is extended or adjusted under 35 U.S.C. 154(b) by 922 days.

(21) Appl. No.: 17/500,004

(22) Filed: Oct. 13, 2021

(65) Prior Publication Data

US 2022/0219239 A1    Jul. 14, 2022

Related U.S. Application Data

(60) Provisional application No. 63/090,882, filed on Oct. 13, 2020.

(51) Int. Cl.
*B22F 10/80*    (2021.01)
*B33Y 30/00*    (2015.01)
(Continued)

(52) U.S. Cl.
CPC .............. *B22F 10/80* (2021.01); *B33Y 30/00* (2014.12); *B33Y 50/00* (2014.12); *G06F 30/20* (2020.01); *G06F 2113/10* (2020.01)

(58) Field of Classification Search
CPC .. B22F 10/80; B22F 2203/03; B22F 2999/00; B22F 10/28; B22F 10/31; B22F 10/366;
(Continued)

(56) References Cited

U.S. PATENT DOCUMENTS

| 10,450,621 B2 | 10/2019 | Abrahams |
| 2015/0231808 A1* | 8/2015 | Konchan ............. B29C 45/7312 703/1 |
| 2021/0311466 A1* | 10/2021 | Yang .................... B29C 64/393 |

OTHER PUBLICATIONS

Assessing printability maps in additive manufacturing of metal alloys (Year: 2019).*

(Continued)

*Primary Examiner* — Emerson C Puente
*Assistant Examiner* — Yi Hao
(74) *Attorney, Agent, or Firm* — Meunier Carlin & Curfman LLC

(57) ABSTRACT

A method for determining alloy processing parameters is provided. Simulated melt pool temperature and melt pool geometries can be used to create an initial printability map based on laser speed and laser power, and the printability map can include regions with potential manufacturing defects. Single-track experiments can be used to calibrate the printability map, to produce a revised printability map. Finally, contour lines representing hatch spacing can also be added to the revised printability map to produce a final printability map that can be used to configure additive manufacturing machinery.

19 Claims, 8 Drawing Sheets

(51) Int. Cl.
  *B33Y 50/00* (2015.01)
  *G06F 30/20* (2020.01)
  *G06F 113/10* (2020.01)

(58) Field of Classification Search
  CPC ........ B22F 10/368; B22F 10/38; B22F 10/85; B33Y 30/00; B33Y 50/00; G06F 30/20; G06F 2113/10; G06F 2119/08; G06F 2119/18
  See application file for complete search history.

(56) References Cited

OTHER PUBLICATIONS

How process parameters drive successful metal AM part production (Year: 2018).*
Melt Pool Characterization for Selective Laser Melting of Ti-6Al-4V Pre-alloyed Powder (Year: 2014).*
Accelerated process optimization for laser-based additive manufacturing by leveraging similar prior studies (Year: 2016).*
Investigation of sample-size influence on tensile test results at different strain rates (Year: 2015).*
Multivariate Calibration and Experimental Validation of a 3D Finite Element Thermal Model for Laser Powder Bed Fusion Metal Additive Manufacturing (Year: 2018).*
"Assessing printability maps in additive manufacturing of metal alloys" by Luke Johnson (Year: 2019).*
"Density and mechanical properties in selective laser melting of Invar 36 and stainless steel 316L" by Mostafa Yakout (Year: 2018).*
L. Johnson et al., "Assessing printability maps in additive manufacturing of metal alloys," Jul. 2019 (Year: 2019).*
M. Yakout et al., "Density and mechanical properties in selective laser melting of Invar 36 and stainless steel 316L," First published in Metal AM vol. 4 No. 2, Nov. 2018 (Year: 2018).*
M. Saunders, "How process parameters drive successful metal AM part production," First published in Metal AM vol. 4 No. 2, Jun. 2018 (Year: 2018).*
H. Gong et al., "Melt Pool Characterization for Selective Laser Melting of Ti-6Al-4V Pre-alloyed Powder," Aug. 2014 (Year: 2014).*
A. Aboutaleb, "Accelerated process optimization for laser-based additive manufacturing by leveraging similar prior studies," Aug. 2016. (Year: 2016).*
M. Rund et al., "Investigation of sample-size influence on tensile test results at different strain rates," Procedia Engineering vol. 114, 2015, pp. 410-415, 2015. https://doi.org/10.1016/j.proeng.2015.08.086 (Year: 2015).*
M. Mahmoudi et al., "Multivariate Calibration and Experimental Validation of a 3D Finite Element Thermal Model for Laser Powder Bed Fusion Metal Additive Manufacturing," Integrating Materials and Manufacturing Innovation (2018) 7:116-135, Jun. 2018. https://doi.org/10.1007/s40192-018-0113-z (Year: 2018).*
Aboutaleb, A.M., et al., Accelerated process optimization for laser-based additive manufacturing by leveraging similar prior studies. IISE Transactions, 2017. 49(1): p. 31-44.
ASM Alloy Phase Diagrams Center, p. G.R., A Study of the Titanium-Nickel System Between Ti2Ni and TiNi, Trans. Metall. Soc. AIME, 2007. Vol. 221, 1961, p. 636-639.
Asm, Metals process simulation, vol. 22b. ASM International, Materials Park, OH, USA, 2010. 724 pages. Description—5 pages.
Averyanova, M., et al., Experimental design approach to optimize selective laser melting of martensitic 17-4 PH powder: part I-single laser tracks and first layer. Rapid Prototyping Journal, 2012. 18(1): p. 28-37.
Boley, C., et al., Metal powder absorptivity: modeling and experiment. Applied optics, 2016. 55(23): p. 6496-6500.
Bosio, F., et al., A time-saving and cost-effective method to process alloys by Laser Powder Bed Fusion. Materials & Design, 2019: p. 107949.
Bourell, D.L., M. Leu, and D. Rosen, Roadmap for additive manufacturing—Identifying the future of freeform processing. The University of Texas at Austin, Laboratory for Freeform Fabrication. Advanced Manufacturing Center, 2009. 102 pages.
Campbell, I., et al., Wohlers report 2019: 3D Printing and Additive Manufacturing State of the Industry: Annual Worldwide Progress Report. 2019: Wohlers Associates. 369 pages. Overview—1page.
Chase Jr, M., NIST-JANAF thermochemical tables fourth edition. J. Phys. Chem. Ref. Data, Monograph, 1998. 9.
Cheng, F., et al., Temperature-dependent thermal properties of a shape memory alloy/MAX phase composite: Experiments and modeling. Acta Materialia, 2014. 68: p. 267-278.
Council, N.R., Accelerating technology transition: bridging the valley of death for materials and processes in defense systems. 2004: National Academies Press.
Criales, L.E., et al., Laser powder bed fusion of nickel alloy 625: experimental investigations of effects of process parameters on melt pool size and shape with spatter analysis. International Journal of Machine Tools and Manufacture, 2017. 121: p. 22-36.
Cunningham, R., et al., Synchrotron-based X-ray microtomography characterization of the effect of processing variables on porosity formation in laser power-bed additive manufacturing of Ti-6Al-4V. Jom, 2017. 69(3): p. 479-484.
Debroy, T., et al., Additive manufacturing of metallic components—process, structure and properties. Progress in Materials Science, 2018. 92: p. 112-224.
Denlinger, E.R., et al., Thermal modeling of Inconel 718 processed with powder bed fusion and experimental validation using in situ measurements. Additive Manufacturing, 2016. 11: p. 7-15.
Eagar, T. and N. Tsai, Temperature fields produced by traveling distributed heat sources. Welding journal, 1983. 62(12): p. 346-355.
Franco, B., et al., A sensory material approach for reducing variability in additively manufactured metal parts. Scientific reports, 2017. 7(1): p. 1-12.
Gong, H., et al. Melt pool characterization for selective laser melting of Ti-6Al-4V pre-alloyed powder. in Solid freeform fabrication symposium. 2014.
Gu, D. and Y. Shen, Balling phenomena during direct laser sintering of multi-component Cubased metal powder. Journal of Alloys and Compounds, 2007. 432(1-2): p. 163-166.
Hegab, H.A., Design for additive manufacturing of composite materials and potential alloys: a review. Manufacturing Review, 2016. 3: p. 11.
Johnson, Luke, Mohamad Mahmoudi, Bing Zhang, Raiyan Seede, Xueqin Huang, Janine T. Maier, Hans J. Maier, Ibrahim Karaman, Alaa Elwany, and Raymundo Arróyave. "Assessing printability maps in additive manufacturing of metal alloys." Acta Materialia 176 (2019): 199-210.
Jung, J., G. Ghosh, and G.B. Olson, A comparative study of precipitation behavior of Heusler phase (Ni2TiAl) from B2—TiNi in Ni—Ti—Al and Ni—Ti—Al-X (X= Hf, Pd, Pt, Zr) alloys. Acta Materialia, 2003. 51(20): p. 6341-6357.
Kamath, C., Determination of process parameters for high-density, Ti-6Al-4V parts using additive manufacturing. 2017, Lawrence Livermore National Lab.(LLNL), Livermore, CA (United States).
Kamath, C., et al., Density of additively-manufactured, 316L Ss parts using laser powder-bed fusion at powers up to 400 W. The International Journal of Advanced Manufacturing Technology, 2013. 74(1-4): p. 65-78.
Kempen, K., et al. Process optimization and microstructural analysis for selective laser melting of AlSi10Mg. in Solid Freeform Fabrication Symposium. 2011.
Kennedy, M.C. and A. O'Hagan, Bayesian calibration of computer models. Journal of the Royal Statistical Society: Series B (Statistical Methodology), 2001. 63(3): p. 425-464.
Khairallah, S.A., et al., Laser powder-bed fusion additive manufacturing: Physics of complex melt flow and formation mechanisms of pores, spatter, and denudation zones. Acta Materialia, 2016. 108: p. 36-45.
Khorasani, A.M., et al., A survey on mechanisms and critical parameters on solidification of selective laser melting during fabrication of Ti-6Al-4V prosthetic acetabular cup. Materials & Design, 2016. 103: p. 348-355.

(56) References Cited

OTHER PUBLICATIONS

King, W., et al., Overview of modelling and simulation of metal powder bed fusion process at Lawrence Livermore National Laboratory. Materials Science and Technology, 2015. 31(8): p. 957-968.
King, W.E., et al., Observation of keyhole-mode laser melting in laser powder-bed fusion additive manufacturing. Journal of Materials Processing Technology, 2014. 214(12): p. 2915-2925.
Letenneur, M., A. Kreitcberg, and V. Brailovski, Optimization of laser powder bed fusion processing using a combination of melt pool modeling and design of experiment approaches: Density control. Journal of Manufacturing and Materials Processing, 2019. 3(1): p. 21.
Li, R., et al., Balling behavior of stainless steel and nickel powder during selective laser melting process. The International Journal of Advanced Manufacturing Technology, 2012. 59(9-12): p. 1025-1035.
Lopez, F., P. Witherell, and B. Lane, Identifying uncertainty in laser powder bed fusion additive manufacturing models. Journal of Mechanical Design, 2016. 138(11): p. 114502.
Madison, J.D. and L.K. Aagesen, Quantitative characterization of porosity in laser welds of stainless steel. Scripta Materialia, 2012. 67(9): p. 783-786.
Mahmoudi, M., et al., Multivariate calibration and experimental validation of a 3d finite element thermal model for laser powder bed fusion metal additive manufacturing. Integrating Materials and Manufacturing Innovation, 2018. 7(3): p. 116-135.
Matthews, M.J., et al., Denudation of metal powder layers in laser powder bed fusion processes. Acta Materialia, 2016. 114: p. 33-42.
Mingear, J., et al., Effect of process parameters and electropolishing on the surface roughness of interior channels in additively manufactured nickel-titanium shape memory alloy actuators. Additive Manufacturing, 2019. 27: p. 565-575.
Mukherjee, T., et al., Printability of alloys for additive manufacturing. Scientific reports, 2016. 6(1): p. 1-8.
Nguyen, Q.B., et al., Characteristics of inconel powders for powder-bed additive manufacturing. Engineering, 2017. 3(5): p. 695-700.
Read, N., et al., Selective laser melting of AlSi10Mg alloy: Process optimisation and mechanical properties development. Materials & Design (1980-2015), 2015. 65: p. 417-424.
Seede, Raiyan, David Shoukr, Bing Zhang, Austin Whitt, Sean Gibbons, Philip Flater, Alaa Elwany, Raymundo Arroyave, and Ibrahim Karaman. "An ultra-high strength martensitic steel fabricated using selective laser melting additive manufacturing: Densification, microstructure, and mechanical properties." Acta Materialia 186 (2020): 199-214.
Tang, M., P.C. Pistorius, and J.L. Beuth, Prediction of lack-of-fusion porosity for powder bed fusion. Additive Manufacturing, 2017. 14: p. 39-48.
Tapia, G., et al., Bayesian calibration and uncertainty quantification for a physics-based precipitation model of nickel-titanium shape-memory alloys. Journal of Manufacturing Science and Engineering, 2017. 139(7).
Tucho, W.M., et al., Investigation of effects of process parameters on microstructure and hardness of SLM manufactured SS316L. Journal of Alloys and Compounds, 2018. 740: p. 910-925.
Valencia, J.J. and P.N. Quested, Thermophysical properties. 2013, 14 pages.
Walker, J.M., et al., Process development and characterization of additively manufactured nickel-titanium shape memory parts. Journal of Intelligent Material Systems and Structures, 2016. 27(19): p. 2653-2660.
Yakout, M., et al., The selection of process parameters in additive manufacturing for aerospace alloys. The International Journal of Advanced Manufacturing Technology, 2017. 92(5-8): p. 2081-2098.
Yap, C.Y., et al., Selective laser melting of nickel powder. Rapid Prototyping Journal, 2017.
Zanotti, C., et al., Comparison between the thermal properties of fully dense and porous NiTi SMAs. Intermetallics, 2010. 18(1): p. 14-21.
Zhang, et al., An Efficient Framework to Assess the Printable Process Space in Metal Laser Powder Bed Fusion.
Zhang, Y., J.R. Evans, and S. Yang, Corrected values for boiling points and enthalpies of vaporization of elements in handbooks. Journal of Chemical & Engineering Data, 2011. 56(2): p. 328-337.
Zhou, X., et al., Balling phenomena in selective laser melted tungsten. Journal of Materials Processing Technology, 2015. 222: p. 33-42.

\* cited by examiner

METHODS OF OPTIMIZING 3-D PRINTING PARAMETERS FOR METALLIC MATERIALS

CROSS-REFERENCE TO RELATED APPLICATIONS

This application claims the benefit of U.S. provisional patent application No. 63/090,882, filed on Oct. 13, 2020, and entitled "METHODS OF DESIGNING PRINTED METALLIC MATERIALS," the disclosure of which is expressly incorporated herein by reference in its entirety.

STATEMENT REGARDING GOVERNMENT SUPPORT

This invention was made with government support under sponsor award W911NF-18-1-0278, awarded by the Army Research Office and under sponsor award 1846676, awarded by the National Science Foundation. The government has certain rights in the invention.

BACKGROUND

In additive manufacturing (AM) (also known as 3D printing), a three-dimensional object is created by incrementally adding material (for example, a metal or metal alloy) to the object. AM technologies rely on the correct configuration of AM parameters to prevent defects. Selecting the correct AM parameters can be challenging. Some of these challenges can be attributed to the fact that existing commercial raw materials used in AM may have been originally developed for other manufacturing processes such as casting, forging, and machining. When attempting to process these materials using AM, the materials undergo different—and sometimes more complex—physical transformations during the AM process, which can result in defects, microstructural inconsistencies, and high degrees of variability.

Developing new alloys for AM involves yet another set of challenges. For example, there is no standard systematic procedure to determine the processing recipes (or parameters) for these new materials. One possible approach is through brute force which can include exhaustive, exploration of the entire parameter space. However, brute force methods can be undesirable due to the amount of time and materials required.

Therefore, additional methods of selecting the AM process parameters that address these and other challenges are needed.

SUMMARY

To improve manufacturing techniques for additive manufacturing and to overcome the limitations of conventional design techniques, systems, methods and devices are disclosed which use models to determine desirable additive manufacturing process parameters.

In one aspect, the present disclosure relates to a method for determining processing parameters for an alloy. In one embodiment, the method includes performing a simulation of melt pool temperature and melt pool geometries for an alloy at a plurality of combinations of a laser speed parameter and a laser power parameter, creating an initial printability map based on the laser speed parameter and the laser power parameter based on the simulation of melt pool temperature and melt pool geometries, defining, within the printability map, one or more regions of the printability map that correspond to one or more manufacturing defects, sampling the printability map to determine a plurality of samples within the printability map, where each sample includes a value of the laser speed parameter and a value of the laser power parameter, performing a set of single-track experiments corresponding to the plurality of samples, calibrating the printability map based on the set of single-track experiments to create a revised printability map, generating a plurality of hatch spacing contours defining a spacing between adjacent beads in a three-dimensional printed part, and adding the plurality of hatch spacing contours to the revised printability map to create a final printability map, where the final printability map represents a printability characteristic of the alloy at a plurality of combinations of laser speed, laser power, and hatch spacing.

In one embodiment, the manufacturing defects comprise keyholing, balling, and lack of fusion.

In one embodiment, the method includes fabricating a bulk sample of the alloy, measuring a porosity value of the bulk sample, and identifying an optimal combination of processing parameters based on the porosity value of the bulk sample.

In one embodiment, the method includes revising the final printability map based on evaluating the bulk sample of the alloy for porosity/density and mechanical properties.

In one embodiment, the method includes sampling the printability map to generate a set of processing parameter values for the laser speed parameter and the laser power parameter, fabricating a plurality of sample parts based on each of the set of processing parameter values for the laser speed parameter and the laser power parameter, measuring a material property of each of the plurality of sample parts to generate a plurality of material property data points, and performing an optimization of the material property based on the material property data points.

In one embodiment, the material property is tensile strength.

In one embodiment, the step of calibrating the printability map includes performing a Bayesian calibration.

In one embodiment, the hatch spacing contours are based on a geometric criterion, where the geometric criterion defines the maximum value of hatch spacing that allows for complete fusion within and between layers of beads of the three-dimensional printed part.

In one embodiment, the final printability map is used to set one or more printer parameters of an additive manufacturing printer.

In one embodiment, sampling the printability map includes defining a grid within the printability map and sampling each point of the grid, where each point in the grid includes a value of the laser speed parameter and a value of the laser power parameter.

In one embodiment, the calibration of the printability map is validated by calculating an absolute prediction error for one or more regions of the printability map.

In one embodiment, sampling the printability map includes defining one or more regions of the printability map, and, for each region in the printability map, selecting a sampling technique from a plurality of sampling techniques and sampling the region using the sampling technique.

In one embodiment, the plurality of sampling techniques includes a grid based sampling technique or a Latin hypercube sampling technique.

In one embodiment, the plurality of sampling techniques includes orthogonal array sampling or central composite design sampling technique.

In one embodiment, the simulation of melt pool temperature and melt pool geometries is an Eagar-Tsai (E-T) simulation.

In one embodiment, defining the printability map includes comparing the melt pool temperature and melt pool geometries to a plurality of threshold ratios, where the threshold ratios represent thresholds at which defects are predicted to occur.

In one embodiment, the threshold ratios are adjusted based on the plurality of single track experiments.

In one aspect the present disclosure relates to a system for additive manufacturing. In one embodiment, the system includes an additive manufacturing printer; a processor; and a memory coupled to the processor; where the memory stores instructions which when executed by the processor cause the system to: perform a simulation of melt pool temperature and melt pool geometries for an alloy at a plurality of combinations of a laser speed parameter and a laser power parameter; create an initial printability map based on the laser speed parameter and the laser power parameter based on the simulation of melt pool temperature and melt pool geometries; define, within the printability map, one or more regions of the printability map that correspond to one or more manufacturing defects; sample the printability map to determine a plurality of samples within the printability map, where each sample includes a value of the laser speed parameter and a value of the laser power parameter; print, using the additive manufacturing printer, a plurality of sample tracks corresponding to the plurality of samples; perform a set of single-track experiments on the plurality of sample tracks to corresponding to the plurality of samples; calibrate the printability map based on the set of single-track experiments to create a revised printability map; generate a plurality of hatch spacing contours defining a spacing between adjacent beads in a three-dimensional printed part; add the plurality of hatch spacing contours to the revised printability map to create a final printability map, where the final printability map represents a printability characteristic of the alloy at a plurality of combinations of laser speed, laser power, and hatch spacing; print, using additive manufacturing printer, a part using a combination of laser speed, laser power, and hatch spacing selected from the plurality of combinations of laser speed, laser power, and hatch spacing of the printability map.

In one embodiment, the combination of laser speed, laser power and hatch spacing is selected from a region of the printability map that does not correspond to any of the one or more manufacturing defects.

In one embodiment, the additive manufacturing printer is a laser powder bed fusion printer configured for metal additive manufacturing processes.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3A illustrates a map of absolute prediction error for melt pool depth, and FIG. 3B illustrates a map of absolute prediction error for melt pool width.

In FIGS. 4A-4B, the white regions represent combinations of print parameters without the modeled manufacturing defects. FIG. 4A is an illustration of a printability map that has been revised based on a number of single-track experiments, which are denoted as a series of "x" and circle marks on the printability map. FIG. 4B illustrates a finalized printability map with hatch spacing contours, where hatch spacing is another important print parameter.

DETAILED DESCRIPTION

Figure 1:
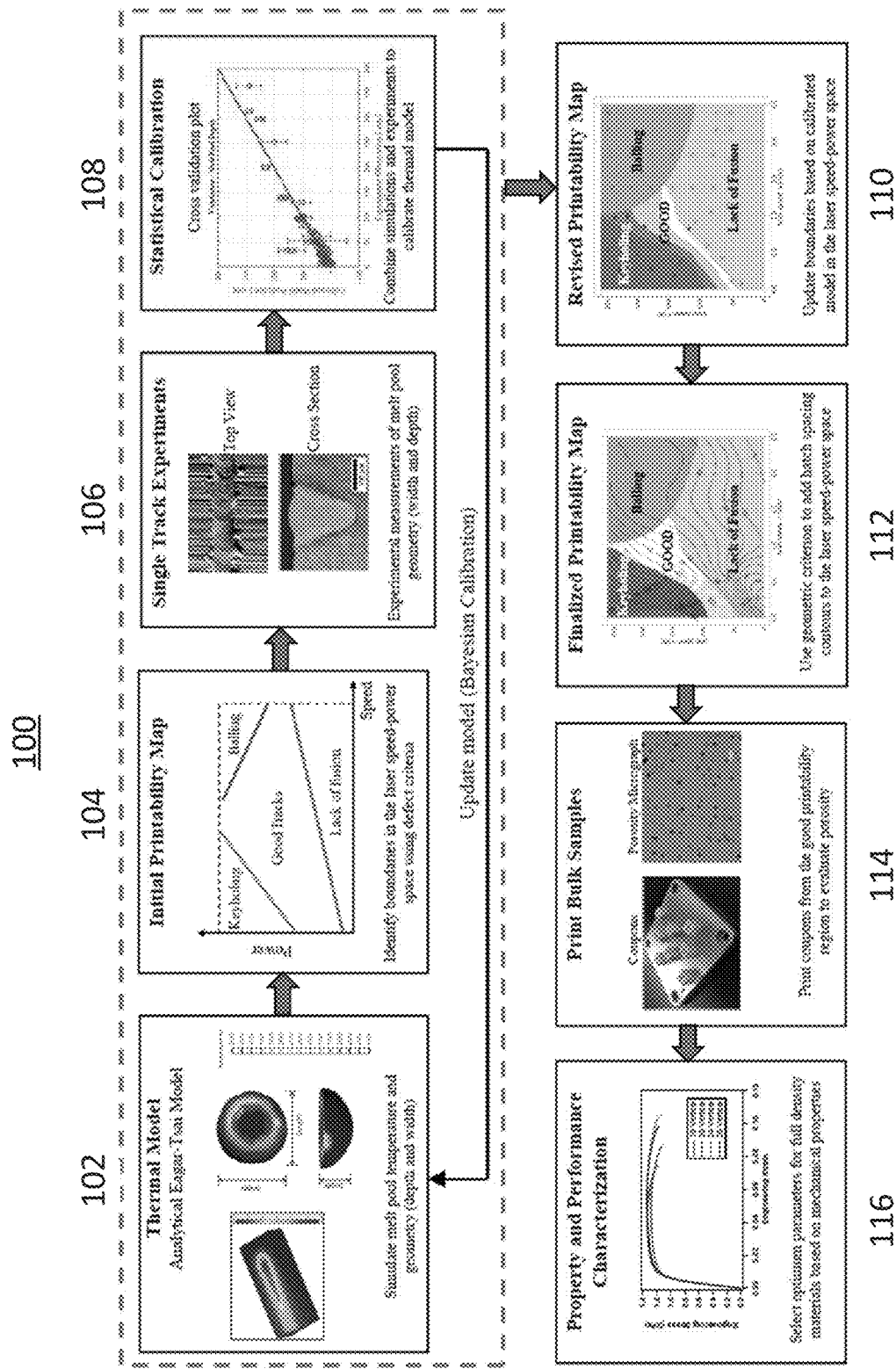
FIG. 1 illustrates a flowchart of a method of determining processing parameters for an alloy, according to an implementation described herein.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary"

means "an example of" and is not intended to convey an indication of a preferred or ideal embodiment. "Such as" is not used in a restrictive sense, but for explanatory purposes.

Throughout this application, various publications may be referenced. The disclosures of these publications in their entireties are hereby incorporated by reference into this application in order to more fully describe the state of the art to which the methods and systems pertain. Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Throughout the present disclosure, the terms "optimal," "optimum" and "optimally" are used to refer to the results of a mathematical optimization problem. It should be understood that the mathematical optimization results described herein are not intended to be limiting, and that different optimization techniques, path planning techniques, constraints, and results are contemplated.

Embodiments of the present disclosure relate to systems and methods for determining a printability map for materials. As a non-limiting example, embodiments of the present disclosure can be used as a unified framework to determine printability maps for a given newly developed material in laser powder bed fusion (LPBF) metal AM processes. Throughout the present disclosure, "a printability map" can refer to windows of processing parameters space within which parts free of macroscopic defects can be produced. Non-limiting examples of processing parameters that can be used in embodiments of the present disclosure include: laser power, P [W], scan speed, V [m/s], and hatch spacing, h [µm]. Non-limiting examples of macroscopic defects that can be mitigated are porosities, cracks, and delamination. These defects can be linked to three common phenomena that may occur during LBPF AM (laser powder bed fusion additive manufacturing): keyholing, lack of fusion, and balling. Again, it should be understood that these defects are only provided as non-limiting examples and that the present disclosure can be used to design materials free of other types of defect.

Methods are disclosed herein that integrate physics-based modeling, experimental characterization, and statistical uncertainty quantification (UQ), to construct a printability map for a desired alloy in a systematic and accelerated fashion. Additionally, implementations described herein can use analytical models. Embodiments of the present disclosure include a framework that can be summarized as follows: through integrating physics-based modeling, experimental characterization, and statistical uncertainty quantification (UQ), a printability map can be constructed in a systematic and accelerated fashion. The modeling step can include an analytical model that is accessible to users, eliminating the need for proprietary computational codes. Furthermore, the analytical model can be computationally tractable which enhances the accelerated aspect of the proposed framework. In some embodiments, the model is an analytical and relatively low fidelity model; and the method can include performing an uncertainty quantification UQ) step. In addition to constructing a printability map for a given new material, embodiments of the present disclosure can guide the microstructural and mechanical characterization of the specimens that are printed according to that map.

Second, for the modeling step implementations described herein can use computationally traceable analytical models combined with an uncertainty quantification step. Further, implementations described herein can be used to characterize both the microstructure and mechanical attributes of the printability map.

FIG. 1 illustrates a method 100 for determining processing parameters for an alloy, according to one implementation described herein. In step 102, a thermal model is used to simulate melt pool temperature and geometry of the target alloy. In the method 100 shown in FIG. 1, the Eagar-Tsai (E-T) analytical thermal model is used, but the use of other types of thermal model to determine melt pool temperature and geometry is contemplated. The analysis of the melt pool geometry can include analyzing information about the melt pool width and depth by identifying temperature contours in the material. Additionally, information including the additive manufacturing (AM) processing parameters can be input into the thermal model as part of performing the simulation step 102.

Defining different regions within the scan speed-laser power space can be correlated with single track melt pool characteristics. For example, the melt pool width, W, and melt pool depth, D, of a single track can be used to determine the potential for defect formation in a printed part. To achieve this, a prediction of the melt pool geometry as a function of the AM processing parameters and material properties in establishing a processing parameter space of producing fully dense parts can be used. This can be done over a wide range of processing parameter combination (i.e. a parameter sweep). Some embodiments of the present disclosure can use a computationally inexpensive analytical thermal model, Eagar-Tsai (E-T) for this task. The E-T model can model welding processes as a traveling heat source with Gaussian profile over a semi-infinite flat plate and calculate the temperature distribution across the plate. The temperature distribution can be used to calculate the melt pool width and depth by identifying melting temperature contours. The E-T model can be used to approximate LPBF AM processes, for example LPBF AM processes according to embodiments of the present disclosure. In some embodiments, the E-T model can exclude phenomena such as phase transformations (e.g. melting and boiling), convective currents within the melt pool as well as liquid-laser interactions resulting in keyhole formation and also considers that thermophysical properties are temperature-independent. Furthermore, an uncertainty quantification (or Bayesian calibration) step can adjust model predictions such that they agree with experiments as described later in this section. Alternatively, in some embodiments of the present disclosure, other models can be used to attain better fidelity with respect to the physics of the process.

The E-T model can take the LPBF processing parameters as inputs. Non-limiting examples of inputs that can be used in embodiments of the present disclosure include laser power, scan speed, and Gaussian-distributed laser beam diameter, and the use of other inputs and processing parameters is contemplated by the present disclosure. The Gaussian-distributed beam diameter which is the diameter corresponding to four standard deviations of the Gaussian profile of the beam. The model can also take thermo-physical material properties as inputs, including thermal conductivity 'k' [W/(m·K)], specific heat capacity 'c' [K/(kg·K)], bulk density 'ρ' [kg/m$^3$], melting temperature 'T$_m$' [K], boiling temperature 'T$_b$' [K]. The absorptivity 'A' [0-1] can provide a measure of the effectiveness in the laser-material energy transfer. Two sources of uncertainty in model predictions are: (1) uncertainty of the thermo-physical material parameters due to the unknown material properties of a newly developed material, and (2) model uncertainty or model discrepancy. Model uncertainty can also originate from missing physics or simplifying assumptions in the model, e.g., the temperature-independent material properties, the semi-infinite plate, and solid substrate surface in contrast to a powder bed as can be the case with LPBF. To account for these and other sources of uncertainty and increase the accuracy of predictions, a Bayesian statistical calibration can be used in some embodiments of the present disclosure. This can estimate the values of uncertain parameters that can make model predictions agree with experiments, and also estimate the discrepancy function through a Gaussian-process approximation to account for deviations between model predictions and experimental observations.

Defining different regions within the scan speed-laser power space can be correlated with single-track melt pool characteristics. In particular, the melt pool width, W, and melt pool depth, D, of a single-track can be used to determine the potential for defect formation in a printed part. The melt pool geometry can be predicted as a function of the AM processing parameters and material properties in establishing a processing parameter space of producing fully dense parts. Furthermore, it can be desirable to perform these predictions over a wide range of processing parameter combinations (i.e. a parameter sweep).

For example, in some implementations described herein, an E-T model can take the laser bed powder fusion (LPBF) processing parameters of laser power, scan speed, and Gaussian-distributed laser beam diameter as inputs. The Gaussian-distributed beam diameter is the diameter corresponding to four standard deviations of the Gaussian profile of the beam. The E-T model can also take thermo-physical material properties as inputs, including thermal conductivity 'k' [W/(m·K)], specific heat capacity 'c' [K/(kg·K)], bulk density 'ρ' [kg/m$^3$], melting temperature 'Tm' [K], boiling temperature 'Tb' The absorptivity 'A' can provide a measure of the effectiveness in the laser-material energy transfer.

Again referring to FIG. 1, in step 104 of the method 100, an initial printability map is generated based on the thermal model. The initial printability map can be based on the thermal model used in step 102 and defect criteria. As shown in 104, the initial printability map is a 2D map that includes combinations of laser power (y-axis) and laser speed (x-axis). The initial printability map includes regions where defects are predicted. In the implementation shown in FIG. 1, the defects are Keyholing, Balling, and Lack of Fusion, although the present disclosure contemplates the analysis of other types of defects. The region in the center of the chart depicted in step 104 ("Good Tracks") represents combinations of processing parameters that are predicted to result in fabricated parts that are free of defects.

The printability map can define regions within the processing parameter space that that correspond to different phenomena (also referred to in the present disclosure as "modes") that occur during LPBF. In some embodiments of the present disclosure, defining regions within the processing parameter space can include reducing the parameter space from a theoretically infinite space in the positive quadrant to a finite space.

Upper and lower bounds on the laser scan speed and laser power can be established. The upper bound on the laser speed, $V_{max}$, can be set to the maximum attainable speed by the laser optics on the AM system while the lower bound, $V_{min}$, can be set to an arbitrarily small value (e.g. 0.05 m/s) slightly above the theoretical minimum (i.e. zero). Using an arbitrarily small $V_{min}$ can be used in models like the E-T model that can specify a moving heat source. The upper bound on the laser power, $Pm_{ax}$, can be set as the maximum power attainable by the AM system (i.e. a limitation or parameter of the AM machine). The lower bound on the laser power, $P_{min}$, can be set as the minimum laser power that will cause melting at a speed of $V_{min}$. This value can be computed using the E-T model.

Figures 5A, 5B, 5C, 5D:
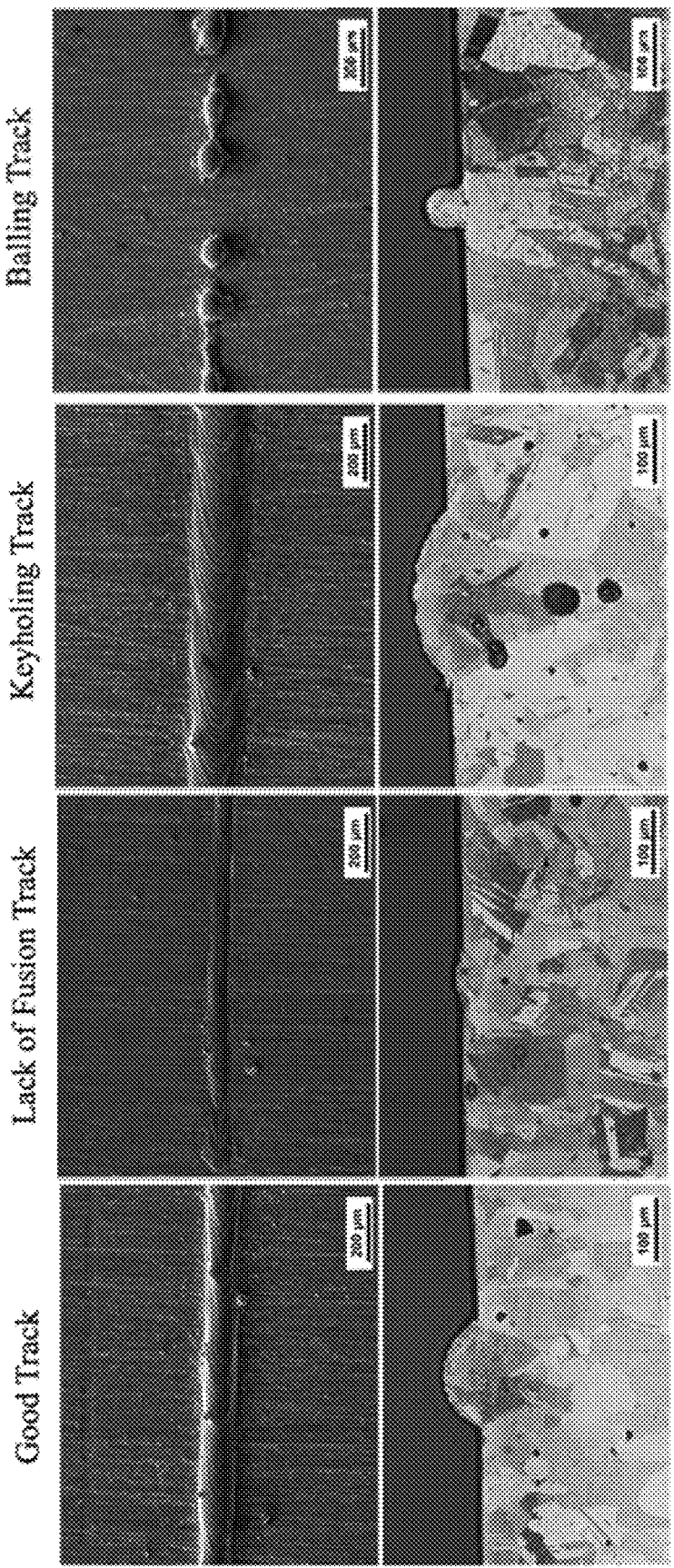
FIGS. 5A-5D illustrate examples of single track samples. The samples include a good track (5A), a lack of fusion track (5B), a keyholing defect track (5C), and a balling defect track (5D).

The E-T model is used to further reduce this space into sub-regions corresponding to phenomena that result in porosity; namely lack of fusion, keyholing, and balling. Examples of these phenomena are depicted in FIG. 5. Lack of fusion can occur when the melt pool depth is smaller than powder layer thickness, t, due to an insufficient amount of laser energy being deposited into the powder bed.

The lack of fusion boundary line can be plotted as the line passing through speed-power combinations that result in a melt pool depth that is equal to the layer thickness t. Large laser energy density can lead to the development of vapor cavities resulting from the recoil pressure associated with the rapid evaporation of the molten liquid. This can cause the laser beam to "drill" into the material to a larger depth than is the case during the general conduction mode. This can ultimately result in the collapse of the cavity, leaving voids known as keyholing porosity.

The balling effect is observed at high laser power and scan speed combinations as the melt pool form into droplets (as opposed to a continuous weld track) due to Plateau-Rayleigh capillary instability. As a non-limiting example, thresholds for plotting lack of fusion, keyholing and balling boundaries are set as D≤t, W/D≤1.5 and L/W≥2.3, respectively. These threshold ratios are derived from empirical observations, physical principles, and geometric considerations. Therefore it is contemplated by the present disclosure that other threshold ratios can be calculated, estimated, or determined according to material properties, melt pool characteristics, risk tolerance, and any other factor. Furthermore, these initial values of the ratios can be revised after experimental measurements. The region of the printability map that is not labeled with a specific defect-causing phenomenon can be considered to be a good region for printing nearly full density parts. It should be understood that these defects, the causes of these defects, and the thresholds identified for these defects are intended only as non-limiting examples, and that the use of other defects and associated thresholds are contemplated by the present disclosure.

In step 106, single-track experiments are performed based on the initial printability map. The single-track experiments can include measurements of melt pool depth and melt pool width. Some of the thermo-physical properties may not be known at the time of running the simulation and can be estimated based on domain expertise or on uncertain values reported in the literature. When finalizing the printability map, these uncertainties can be quantified and accounted for such that model predictions are in agreement with experimental observations. This process can include statistical model calibration, described herein. Single-track experiments can be used to obtain the experimental observations that can be required for calibrating the printability map. The printability map can be sampled, for example by grid sampling. The sampling selects different laser scan speed and laser power combinations within the parameter space. Other sampling strategies are contemplated by the present disclosure. Non-limiting examples of other sampling techniques that can be used include Latin hypercube sampling (LHS), orthogonal array sampling, and central composite design.

The initial printability map in steps 102 104 can be constructed based on E-T model simulations. In some embodiments of the present disclosure, the parameters and models can include uncertainties, for example, the value of some of the thermo-physical properties can be unknown at the time of running the simulation, or based on estimates which include uncertainty. Embodiments of the present disclosure can quantify and account for these uncertainties so that model predictions are in agreement with experimental observations (e.g., by statistical model calibration). Single track experiments can be conducted to obtain the experimental observations needed for calibration. Sampling techniques (e.g., grid sampling) can be used to select different laser scan speed-power combinations within the parameter space. Again, as a non-limiting example, 60 processing parameter combinations can be used to cover a finite model space. The present disclosure also contemplates the use of other sampling strategies, such as Latin hypercube sampling (LHS), orthogonal array sampling, or central composite design.

As a non-limiting example 10 mm-long single tracks spaced 1 mm apart from one another can be printed as samples. The powder layer thickness can be set to the $80^{th}$ percentile of the powder size distribution (known as $d_{80}$). Characterization of the single tracks using microscopy can be conducted to measure melt pool width and depth. Scanning electron microscope (SEM) images of the single-track tops can be used to measure the melt pool width at locations (e.g. 9 locations) along the track and the average of these measurements can be taken as the melt pool width. Optical microscope (OM) images of 3 melt pool cross sections can be used to measure melt pool depth after sectioning, polishing, and etching. Again, the instruments, number of samples, and measurement techniques described herein are intended only as non-limiting examples and the use of different types of samples, and different methods of measuring and processing the samples, is contemplated by the present disclosure.

Figure 2:
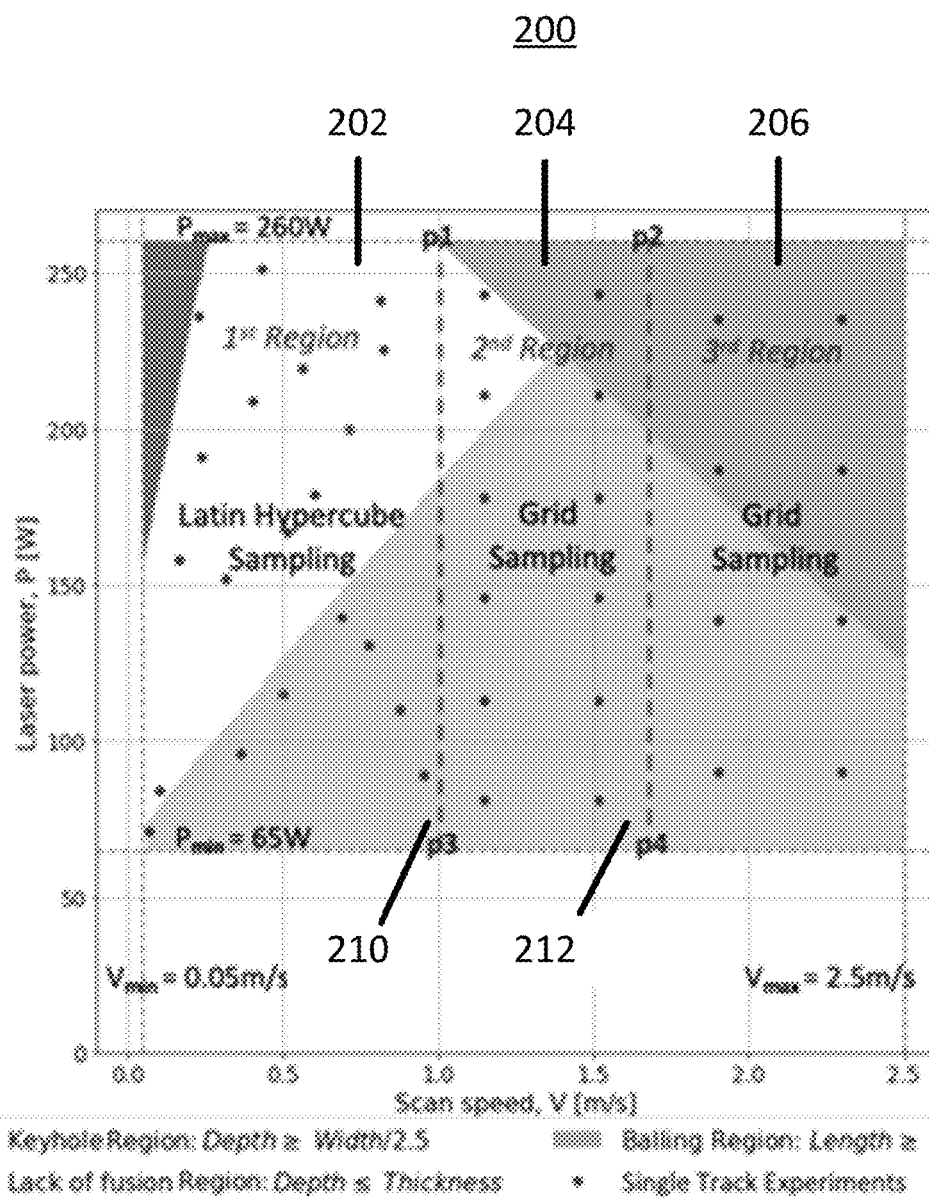
FIG. 2 illustrates an example of a printability map that has been divided into regions and sampled.

FIG. 2 depicts experimentally characterized single tracks shown in an example printability map 200. In some embodiments of the present disclosure, the printability map 200 can be divided into regions 202 204 206 as shown in FIG. 2. The printability map shown in FIG. 2 includes three regions 202 204 206, but the present disclosure contemplates that the printability map can be divided into any number of regions 202 204 206. Different sampling techniques can be used to sample the space in each region 202 204 206, and/or some regions 202 204 206 may use the same sampling techniques as other regions. As a non-limiting example, the printability map shown in FIG. 2 is divided into three regions 202 204 206, where the first region 202 is sampled using Latin hypercube sampling, the second region 204 is sampled using a grid, and the third region 206 is sampled using a grid. The nodes of balling criterion line and lack of fusion criterion line of $Pm_{ax}$ boundary (p1 and p2) were used to draw lines perpendicular to Pmim boundary at point p3 and point p4. Then these two lines 210 212, p1-p3 and p2-p4, split the finite space into different regions. The first line 210 runs between p1 and p3, and the second line 212 runs between p2 and p4. It should be understood that the spacing and shape of the lines shown is intended only as a non-limiting example, and that the present disclosure contemplates that other regions 202 204 206 can be divided by different lines selected using different criteria.

Different sizes of single-tracks are possible. According to a non-limiting example, 10 mm-long single-tracks spaced 1 mm apart from one another can be printed. The powder layer thickness can be set to the 80th percentile of the powder size distribution (commonly known as d80). Characterization of the single-tracks using microscopy can be conducted to measure melt pool width and depth. Scanning electron microscope (SEM) images of the single-track tops can be used to measure the melt pool width at locations along the track and the average of these measurements can be selected as the melt pool width. However, methods of measuring or calculating the melt pool width are contemplated. Optical microscope (OM) images of melt pool cross sections can be used to measure melt pool depth after sectioning, polishing, and etching. Again, different methods of viewing, measuring, and calculating the melt pool depth are contemplated, and these values of powder layer thickness, depth, and length are intended as non-limiting examples.

Based on the experiments performed in step 106, the model can be calibrated in step 108 to produce a revised printability map, as shown in step 110. The calibration performed in step 108 can be a Bayesian calibration, or a calibration performed based on uncertainty quantification, or any other calibration that can adjust the model predictions to agree with the experiments performed in step 106. The present disclosure contemplates that steps 102-108 may be repeated as necessary to update the statistical model.

Figure 3A:
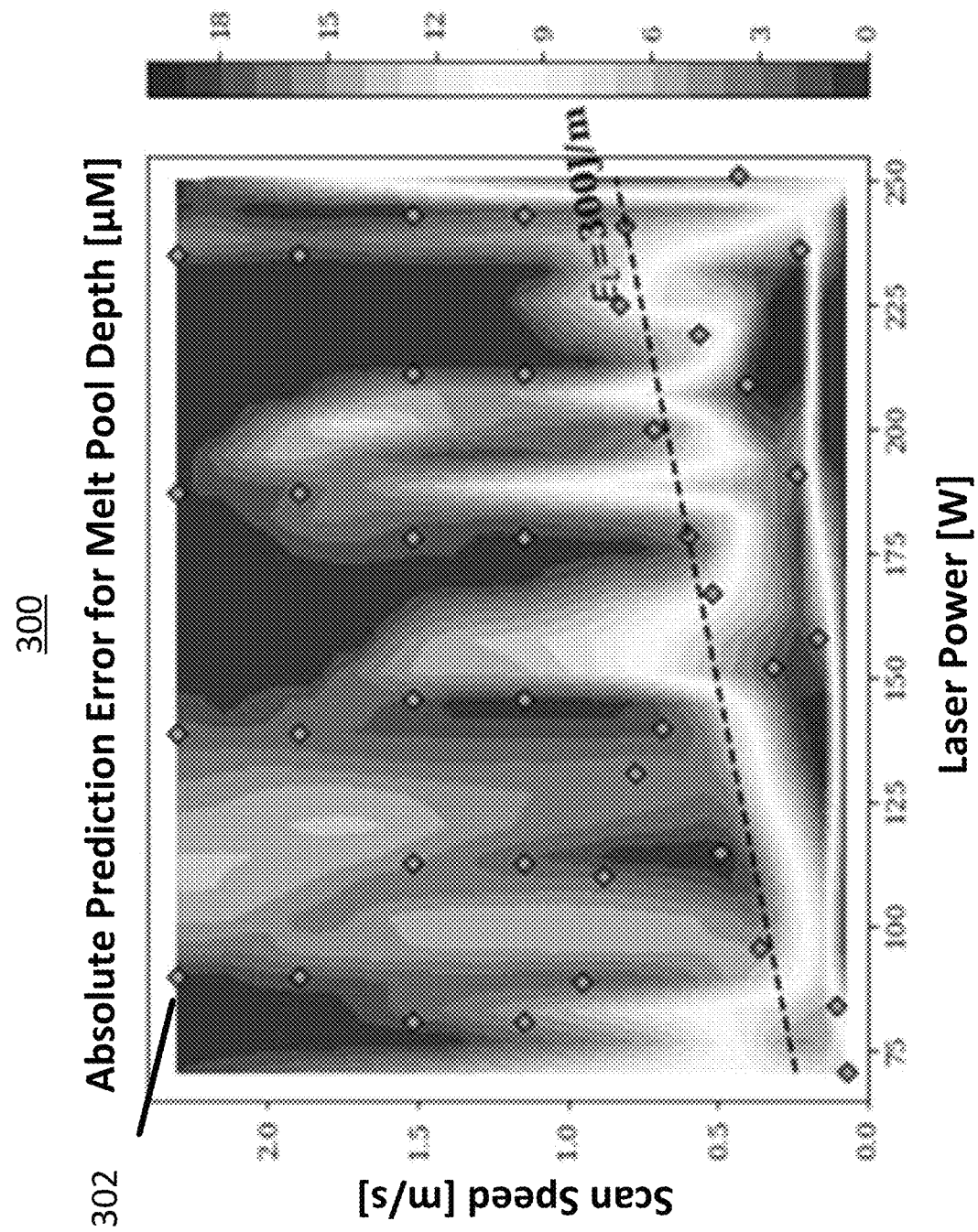
FIGS. 3A-3B illustrate examples of maps of absolute prediction error for melt pool dimensions compared to markers representing single track experiments.
Figure 3B:
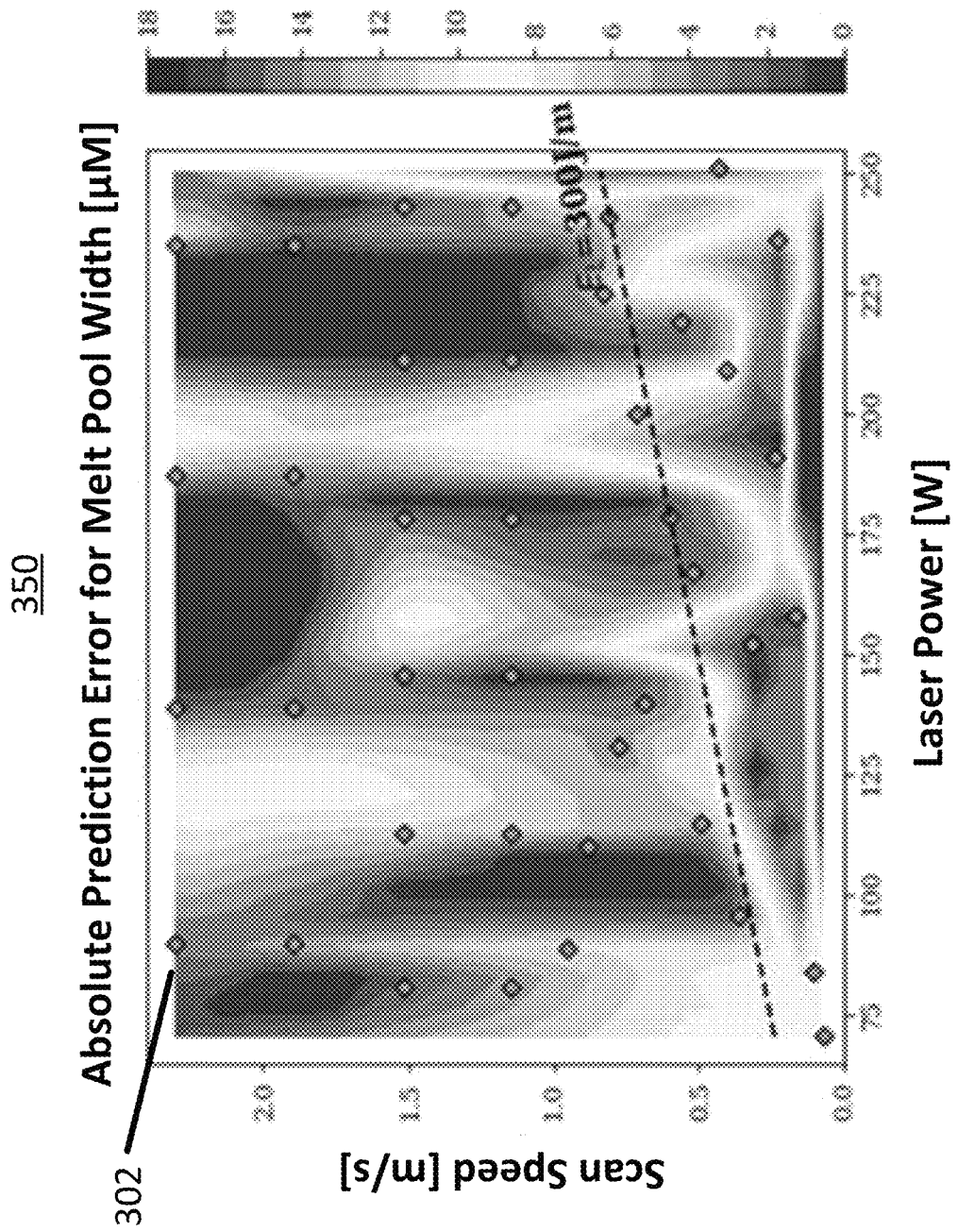

According to one implementation described herein, the calibration is performed using a Bayesian procedure. The Bayesian procedure for calibrating the model can include constructing a Gaussian process surrogate model of the original E-T model. The surrogate model can be computationally less expensive than the original E-T model and can be used to generate sufficiently large numbers of simulations for performing calibration. The surrogate model is developed based on simulations first generated from the E-T model according to a Latin hypercube sampling strategy. a Gaussian process is fit to these simulations. Simulations generated through the surrogate model with experimental observations obtained from single-track experiments to calibrate the model parameters and estimate model uncertainty. Three input model parameters can be identified as calibration parameters: thermal conductivity 'k', specific heat capacity 'c' and absorptivity 'A'. When developing the surrogate model, a range of values can be selected for each calibration parameter including its prior estimation value in order for the surrogate model to be valid for many or all of the possible calibration parameter values. For example, the estimation of absorptivity for Nickel Titanium alloy (NiTi) is 0.56. Choices of 'A' that are generated can be used to train the surrogate model. The mean of the posterior distribution of 'A' can be derived through statistical model calibration as its calibrated parameter value. To test the accuracy of the calibrated model, the absolute prediction error for melt pool width and depth across the processing space can be calculated. FIGS. 3A and 3B illustrate shaded maps 300 350 of absolute prediction error for melt pool depth and melt pool width, respectively. Markers 302 illustrate single track experiments. The absolute prediction error can be used by embodiments of the present disclosure to determine if an adequate number of single track experiments have been performed. In some embodiments of the present disclosure, performing additional single track experiments in a region (e.g. the regions 202 204 206 shown in FIG. 2) can reduce the absolute prediction error in that region.

In the non-limiting example shown in FIGS. 3A-B, the processing parameter combinations with linear energy density (EL) less than 300 J/m have larger prediction errors. This can indicate that, in this non-limiting example, more single-track experiments with EL<300 J/m are can be used to acquire missing information. The mean absolute percentage error (MAPE) can also be calculated in embodiments of the present disclosure, and the MAPE for the width predictions and depth predictions corresponding to FIGS. 3A-B were determined as 3.6% and 4.05%. This can be an acceptable MAPE in some embodiments of the present disclosure.

In some embodiments of the present disclosure, statistical model calibration can involve combining experimental observations $y^E$ of the real process run at some values of control inputs x, and model simulations $y^S$ to calibrate unknown model parameters θ, and estimate model uncertainty (systematic bias between model predictions and experiments due to missing physics, a discrepancy function δ(x), and experimental measurement errors ε). This can be described by the following equation:

$$yE(x)=yS(x,\theta)+\delta(x)+\varepsilon(x) \tag{1}$$

In some embodiments of the present disclosure, calibration can be conducted using a Bayesian procedure. A Gaussian process surrogate model of the original E-T model can be constructed. This surrogate model can be computationally less expensive than the original E-T model and is needed to generate sufficiently large numbers of simulations needed to conduct calibration. As a non-limiting example, to develop the surrogate model, 1000 simulations can be generated from the E-T model according to an LHS (Latin Hypercube Sampling strategy. Next, a Gaussian process is fit to these simulations. Simulations generated through that surrogate model with experimental observations obtained from single track experiments to calibrate the model parameters and estimate model uncertainty. Three input model parameters are identified as calibration parameters since model simulations tend to be sensitive to them: thermal conductivity 'k', specific heat capacity 'c' and absorptivity 'A'. a range of values need to be selected for each calibration parameter for the surrogate model including its prior estimation value. As a non-limiting example, the estimation of absorptivity for Nickel Titanium alloy (NiTi) can be given as 0.56. 100 choices of 'A' can be generated from (0, 1) and used to train the surrogate model. Then the mean of the posterior distribution of 'A' can be derived through statistical model calibration as its calibrated parameter value.

The calibrated E-T surrogate model can now be used to revise the defect boundaries in the initial printability map resulting in a revised printability map (e.g. the printability map of step 110).

Figure 4A:
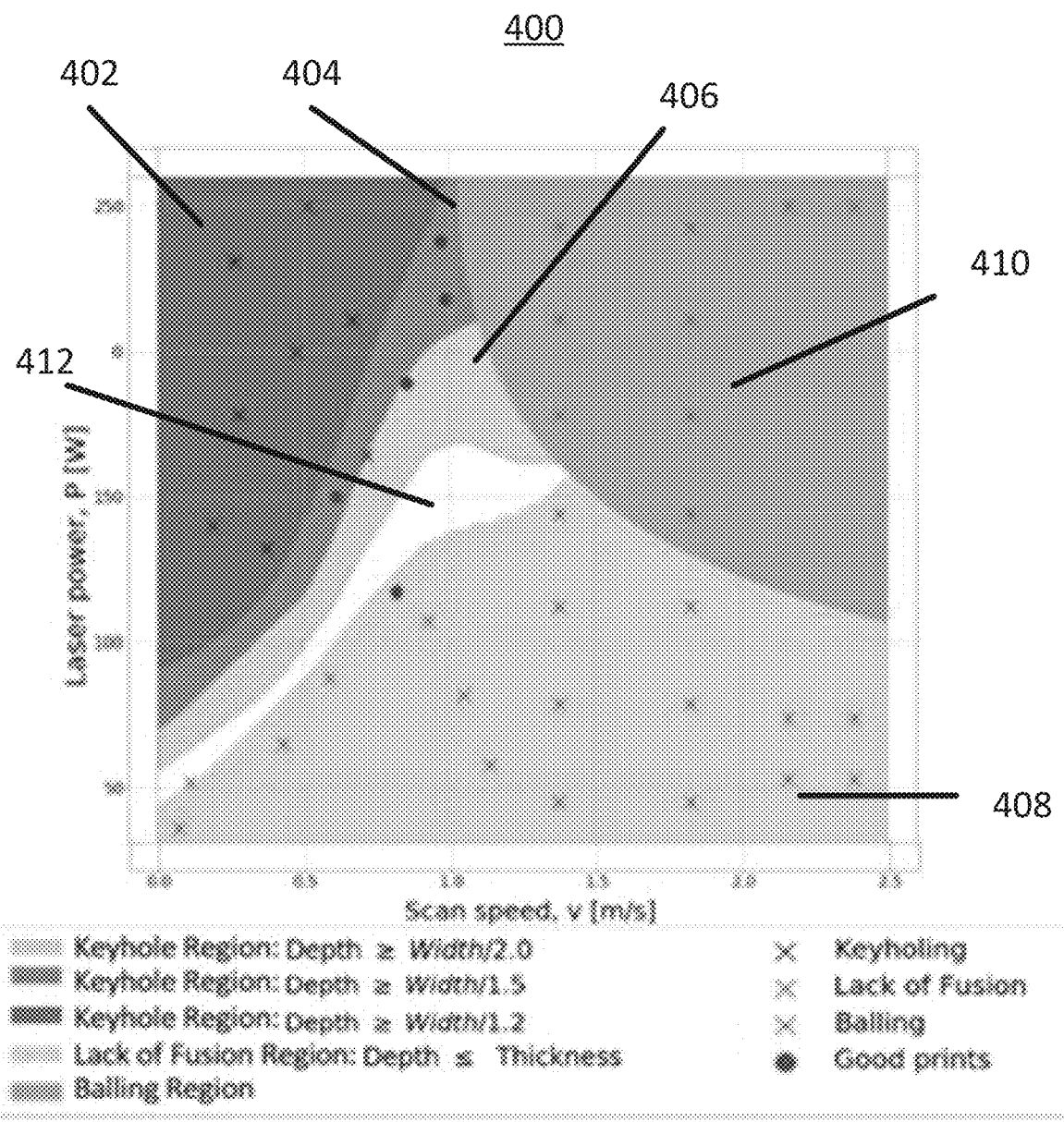
FIGS. 4A-4B illustrate examples of a printability map, according to one implementation of the present disclosure.

In step 110, a revised printability map can be created. The revised printability map can include regions corresponding to defects, as well as a region or regions where no defects are predicted. As shown in step 110, some regions of the printability map represent defects (keyholing, balling, and lack of fusion) a region, near the center of the graph shown in 110, corresponds to a "GOOD" region (i.e. region of the printability map where the three defects are not predicted to occur). In step 112, a finalized printability map is generated including contour lines. The contour lines represent the maximum hatch spacing (the distance between two adjacent passes of the laser beam within the same layer) for the laser power and laser speed combinations shown in the revised printability map. These contour lines can be calculated based on geometric criteria relating melt pool depth to the known layer thickness of the powder layers. The contour lines in the final printability map can be used to show how the range of valid (i.e. predicted to be defect-free) laser power and laser speed parameters changes for different values of hatch spacing. FIG. 4A depicts a revised printability map 200 including "x" marks representing experimental results. As shown in FIG. 4A, different shading can represent different regions of the printability map 400. The different regions of the printability map can correspond to different types of defects, or to measures of the defects. As a non-limiting example, in the printability map 400 shown in FIG. 4A, keyholing is represented by three regions 402, 404, 406, where each of the three regions can represent a different minimum depth. In the non-limiting example shown in FIG. 4A, a keyhole region with a depth greater than or equal to width/1.2 is shown as a region 402, and a depth greater than or equal to width/1.5 is shown as another region 404. Another keyhole region 406 is shown where the depth is greater than width/2.0. Similarly, a lack of fusion where depth is less than or equal to thickness, can be shown as another shaded region 408. And a balling region 410 can be shown as another shaded region. A region without any predicted defects (i.e. a "good region") can be shown using a region with a different shade, or as a region without shading 412, as shown in FIG. 4A. Experimental information can be included in the printability map, or overlaid on the printability map. As shown in FIG. 4A, dots representing samples to print, or samples that have been printed are overlaid on the printability map. These samples can be used to confirm or validate the accuracy of the printability map 400.

Figure 4B:
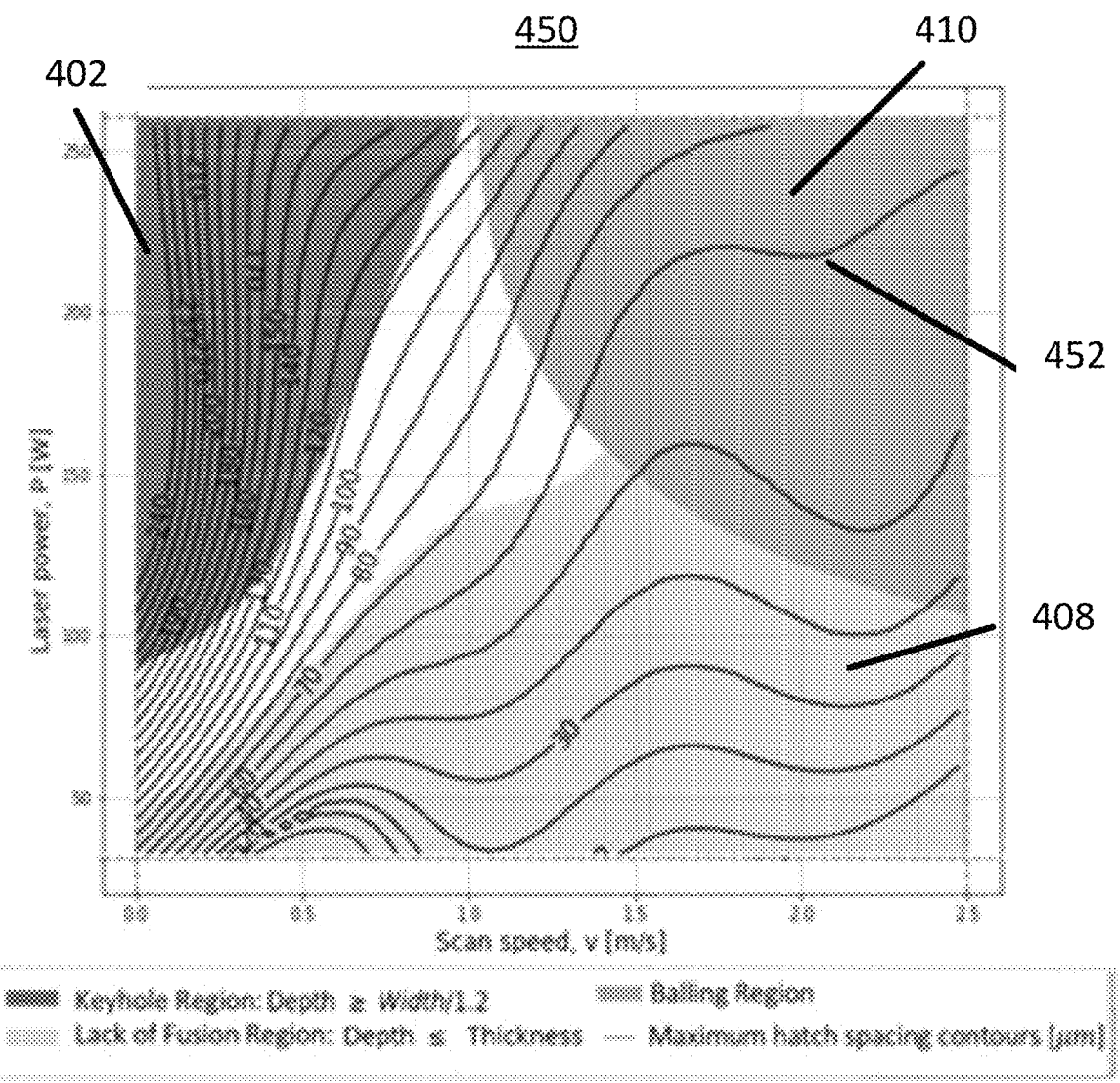

FIG. 4B depicts a final printability map 450 including contour lines 452 representing different hatch spacings, given in micrometers (μm). Similar to the printability map depicted in FIG. 4A, the printability map 250 in FIG. 4B depicts a keyhole region (depth greater than or equal to Width/1.2) 402, balling region 410, and lack of fusion region (depth less than or equal to thickness) 408. It should be understood that the defect ratios and thresholds are provided only as examples, and that other defect measurements/ thresholds are contemplated by the present disclosure. In particular, defect thresholds can vary based on the processes and materials used. It should be understood that the thresholds given throughout the present disclosure (e.g. the threshold that the depth is greater than the width/1.2) are intended only as non-limiting examples. Example illustrations of SEM data illustrating Balling, Keyholing, and Lack of fusion, as compared to a "good" track are illustrated in FIGS. 5A-D. These examples of balling, keyholing, and lack of fusion can correspond to the shapes of those defects in embodiments of the present disclosure (e.g. the single track samples referred to above with reference to FIG. 1). The illustrations show an example of a "good track" (5A), a lack of fusion track (5B), a keyholing defect track (5C), and a balling defect track (5D). It should be understood that the illustrations in FIG. 5A-5D are intended only as non-limiting examples, and that embodiments of the present disclosure can include different definitions or criteria for assessing whether these or other defects are present.

In implementations of the present disclosure, the maximum hatch spacing can be computed. Hatch spacing can be defined ash, the distance between two adjacent passes of the laser beam within the same layer. For example, a geometric criterion can be used to compute the maximum value for h that allows for full fusion within and between layers for a given melt pool width, melt pool depth, and layer thickness. Maximum hatch spacing $h_{max}$ can be calculated as shown in equation 1, below. In equation 1, W represents the melt pool width, D represents the melt pool depth, and t represents the layer thickness.

$$h_{max} = W\sqrt{1 - \frac{t}{t+D}} \quad (1)$$

The values of $h_{max}$ for different values of W, t, and D, can be used to calculate maximum hatch spacing contours in the final printability map. Other equations and methods for determining maximum hatch spacing are contemplated by the present disclosure.

Based on the final printability map, three-dimensional parts can be created based on AM processes. The information in the printability map (laser speed, laser power, and hatch spacing) can correspond to processing parameters on AM machines, including commercially available AM machines such as selective laser melting (SLM) and direct metal laser sintering (DMLS) machines. Therefore, the techniques described with reference to FIG. 1, steps 102, 104, 106, 108, 110, and 112 as well as FIGS. 4A-4B can be used to determine calibration settings that reduce or eliminate defects in AM for the specified alloy.

Additional steps can be performed to further calibrate the printability map, improve the performance of the model, and perform additional desired optimization steps. With reference to FIG. 1, in step 114, bulk samples (i.e. "bulk coupons") can be fabricated based on the final printability map. These bulk samples can be used to evaluate the porosity/density of parts made with different parameter combinations. This information can be used to further refine the final printability map. The evaluation of parameters other than porosity in step 114 is contemplated by the present disclosure.

Again referring to FIG. 1, in step 116 the properties of the bulk samples can be analyzed. For example, the evaluation of the bulk samples can include measurements of tensile strength and ductility. By evaluating the tensile strength of multiple bulk samples, an optimization step can be performed to determine the valid print parameters that result in the optimal tensile strength. For example, processing parameters that resulted in samples with highest density (>99% of theoretical density) can be selected to print mechanical test samples. As a general guideline, 8-15 processing parameter combinations for porosity coupons and 4-5 parameter combinations for mechanical test specimens are recommended. Optionally, the samples printed in step 116 can be printed with print parameters that are predicted to be free of defects based on steps 102-114. However, these numbers of processing parameter combinations are intended only as non-limiting examples. The optimization of properties other than tensile strength, as well as the optimization of more than one bulk sample property, is contemplated by the present disclosure.

Figure 6:
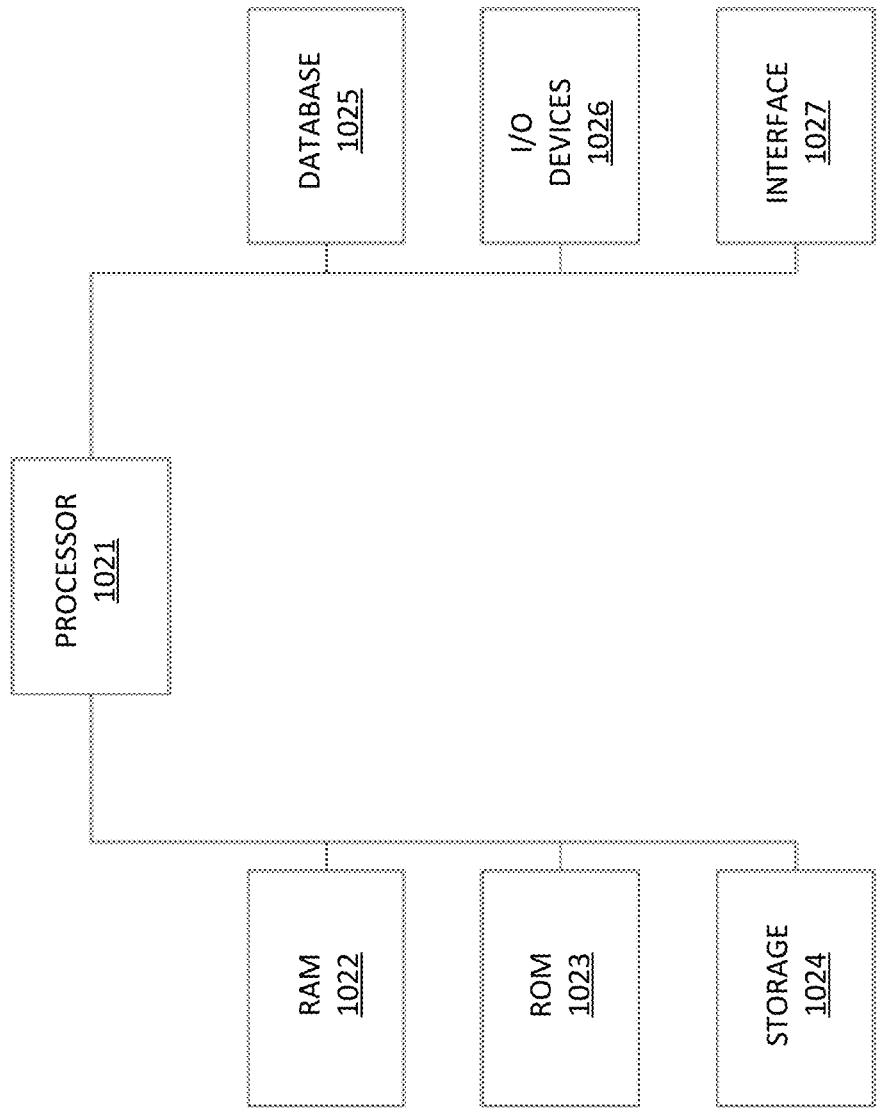
FIG. 6 illustrates an exemplary computer that may comprise all or a portion of the system for determining gradient paths for compositionally graded alloys, or a control system for multi-material printers; conversely, any portion or portions of the computer illustrated in FIG. 3 may comprise all or a portion of the system for determining gradient paths for compositionally graded alloys, or a control system for multi-material printers; conversely.

FIG. 6 illustrates an exemplary computer that may comprise all or a portion of a system for generating printability maps for AM. Conversely, any portion or portions of the computer illustrated in FIG. 6 may comprise all or part of the system for generating printability maps for AM. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments such as, for example, an algorithm for determining a property profile gradient. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a system (e.g., a system for generating printability maps for AM) and/or receiving and/or processing and/or transmitting data associated with electrical sensors. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the plurality of thrust coefficients. The database may also contain data and instructions associated with computer-executable instructions for controlling a system (e.g., an multi-material printer) and/or receiving and/or processing and/or transmitting data associated with a network of sensor nodes used to measure water quality. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described herein above. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for printing a defect-free metal part by a laser powder bed fusion system, the method comprising:
    performing a simulation of melt pool temperature and melt pool geometries for an alloy at a plurality of combinations of a laser speed parameter and a laser power parameter;
    creating an initial printability map based on the laser speed parameter and the laser power parameter based on the simulation of melt pool temperature and melt pool geometries;
    defining, within the printability map, one or more regions of the printability map that correspond to one or more manufacturing defects;
    sampling the printability map to determine a plurality of samples within the printability map, wherein each sample comprises a value of the laser speed parameter and a value of the laser power parameter;
    printing a set of single-track experiments using the laser powder bed fusion system, wherein the laser powder bed fusion system is configured to print single tracks corresponding to the plurality of samples;
    calibrating the printability map based on the set of single-track experiments to create a revised printability map;
    generating a plurality of hatch spacing contours based on a geometric criterion, wherein the plurality of hatch spacing contours define a spacing between adjacent beads in a three-dimensional printed part;
    adding the plurality of hatch spacing contours to the revised printability map to create a final printability map, wherein the final printability map represents a printability characteristic of the alloy at a plurality of combinations of laser speed, laser power, and hatch spacing;
    printing a bulk sample of the alloy using the laser powder bed fusion system, wherein the laser powder bed fusion system is configured based on the finalized printability map;
    measuring a bulk sample property of the bulk sample;
    identifying an optimal combination of processing parameters based on the bulk sample property of the bulk sample;
    configuring the laser powder bed fusion system to print the defect-free metal part using the optimal combination of processing parameters, wherein the optimal combination of processing parameters comprise laser speed, laser power, and hatch spacing; and
    printing the defect-free metal part using the laser powder bed fusion system with the optimal combination of laser speed, laser power, and hatch spacing.

2. The method of claim 1, wherein the manufacturing defects comprise keyholing, balling, and lack of fusion.

3. The method of claim 1, further comprising: revising the final printability map based on evaluating the bulk sample of the alloy for porosity/density and mechanical properties.

4. The method of claim 1, further comprising:
    sampling the printability map to generate a set of processing parameter values for the laser speed parameter and the laser power parameter;
    fabricating a plurality of sample parts based on each of the set of processing parameter values for the laser speed parameter and the laser power parameter;
    measuring a material property of each of the plurality of sample parts to generate a plurality of material property data points; and
    performing an optimization of the material property based on the material property data points.

5. The method of claim 4, wherein the material property is tensile strength.

6. The method of claim 1, wherein the step of calibrating the printability map comprises performing a Bayesian calibration.

7. The method of claim 1, wherein the hatch spacing contours are based on the geometric criterion, wherein the geometric criterion defines the maximum value of hatch spacing that allows for complete fusion within and between layers of beads of the three-dimensional printed part.

8. The method of claim 1, wherein the final printability map is used to set one or more printer parameters of an additive manufacturing printer.

9. The method of claim 1, wherein sampling the printability map comprises defining a grid within the printability map and sampling each point of the grid, wherein the each point in the grid comprises a value of the laser speed parameter and a value of the laser power parameter.

10. The method of claim 1, wherein the calibration of the printability map is validated by calculating an absolute prediction error for one or more regions of the printability map.

11. The method of claim 1, wherein sampling the printability map comprises defining one or more regions of the printability map, and, for each region in the printability map, selecting a sampling technique from a plurality of sampling techniques and sampling the region using the sampling technique.

12. The method of claim 11, wherein the plurality of sampling techniques comprise a grid based sampling technique or a Latin hypercube sampling technique.

13. The method of claim 11, wherein the plurality of sampling techniques comprises orthogonal array sampling or central composite design sampling technique.

14. The method of claim 1, wherein the simulation of melt pool temperature and melt pool geometries is an Eagar-Tsai (E-T) simulation.

15. The method of claim 1, wherein defining the printability map comprises comparing the melt pool temperature and melt pool geometries to a plurality of threshold ratios, wherein the threshold ratios represent thresholds at which defects are predicted to occur.

16. The method of claim 15, where the threshold ratios are adjusted based on the set of single-track experiments.

17. A system, comprising:
a laser powder bed fusion printer;
a processor; and
a memory coupled to the processor, wherein the memory stores instructions which when executed by the processor cause the system to:
perform a simulation of melt pool temperature and melt pool geometries for an alloy at a plurality of combinations of a laser speed parameter and a laser power parameter;
create an initial printability map based on the laser speed parameter and the laser power parameter based on the simulation of melt pool temperature and melt pool geometries;
define, within the printability map, one or more regions of the printability map that correspond to one or more manufacturing defects;
sample the printability map to determine a plurality of samples within the printability map, wherein each sample comprises a value of the laser speed parameter and a value of the laser power parameter;
print, using the laser powder bed fusion printer, a plurality of sample tracks corresponding to the plurality of samples;
perform a set of single-track experiments on the plurality of sample tracks to corresponding to the plurality of samples;
calibrate the printability map based on the set of single-track experiments to create a revised printability map;
generate a plurality of hatch spacing contours based on a geometric criterion, wherein the plurality of hatch spacing contours define a spacing between adjacent beads in a three-dimensional printed part;
add the plurality of hatch spacing contours to the revised printability map to create a final printability map, wherein the final printability map represents a printability characteristic of the alloy at a plurality of combinations of laser speed, laser power, and hatch spacing;
fabricate a bulk sample of the alloy using the laser powder bed fusion printer, wherein the laser powder bed fusion printer is configured-based on the finalized printability map;
measure a bulk sample property of the bulk sample;
identify an optimal combination of processing parameters based on the bulk sample property of the bulk sample;
configure the laser powder bed fusion printer to print the defect-free metal part using the optimal combination of processing parameters, wherein the optimal combination of processing parameters comprise laser speed, laser power, and hatch spacing; and
print, using the laser powder bed fusion printer, the defect-free metal part using a combination of laser speed, laser power, and hatch spacing selected from the plurality of combinations of laser speed, laser power, and hatch spacing of the printability map to operate the laser powder bed fusion printer with the optimal combination of laser speed, laser power, and hatch spacing.

18. The system of claim 17, wherein the combination of laser speed, laser power and hatch spacing is selected from a region of the printability map that does not correspond to any of the one or more manufacturing defects.

19. The system of claim 17, wherein the laser powder bed fusion printer is a mixed-material printer configured for metal additive manufacturing processes.

* * * * *